United States Patent [19]

le Grand et al.

[11] Patent Number: 5,046,411
[45] Date of Patent: Sep. 10, 1991

[54] APPARATUS FOR PEELING FOOD PRODUCTS

[75] Inventors: Ferdinand le Grand; Ned C. Stevens, both of Gainesville, Fla.

[73] Assignee: University of Florida, Gainesville, Fla.

[21] Appl. No.: 603,919

[22] Filed: Oct. 26, 1990

[51] Int. Cl.⁵ .............................................. A23N 7/00
[52] U.S. Cl. ...................................... 99/472; 99/516; 99/584
[58] Field of Search ................. 99/467, 469, 470, 472, 99/483, 516, 537, 540, 567, 568, 584; 426/481, 482, 511, 447, 509

[56] References Cited

U.S. PATENT DOCUMENTS

| | | | |
|---|---|---|---|
| 3,759,166 | 9/1973 | Trandin et al. | 99/472 |
| 4,026,203 | 5/1977 | Levati | 99/584 |
| 4,092,910 | 6/1978 | Genchev et al. | 99/483 |
| 4,300,448 | 11/1981 | Hayashi et al. | 99/516 |
| 4,315,039 | 2/1982 | Levati | 426/482 |
| 4,524,681 | 6/1985 | Harris et al. | 99/483 |
| 4,562,772 | 1/1986 | Battistini | 99/472 |
| 4,671,965 | 6/1987 | Harris et al. | 99/584 |

FOREIGN PATENT DOCUMENTS 0984432  1/1983  U.S.S.R. ............................... 99/472

Primary Examiner—Timothy F. Simone
Attorney, Agent, or Firm—Arthur G. Yeager; Earl L. Tyner

[57] ABSTRACT

Apparatus for continuously peeling food products such as citrus fruit and shrimp comprising a rotating drum having separately operable and closable compartments which when closed are subjected to steam and then to a suddenly applied vacuum, the peelings are loosened by the steam and vacuum treatment; and the partially peeled food is discharged onto a plurality of parallel counter-rotating rollers that strip away the peelings and allow the peeled product to fall onto a conveyor.

16 Claims, 3 Drawing Sheets

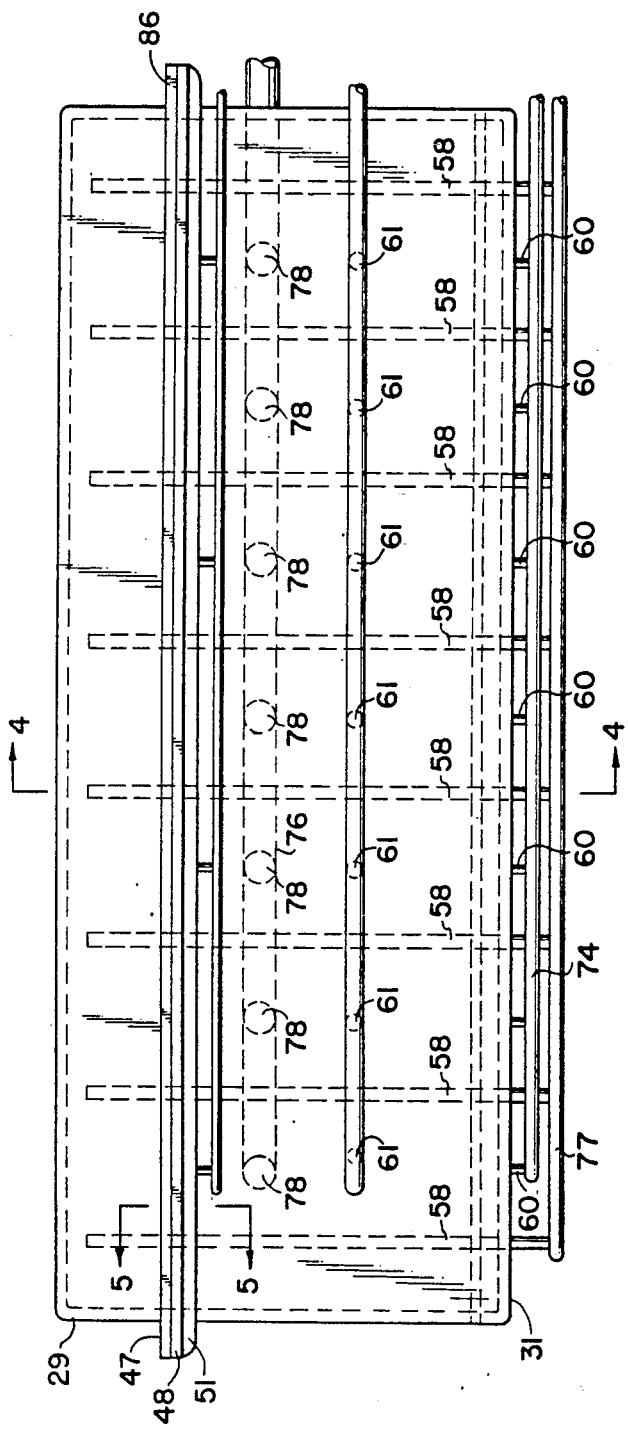
FIG 3
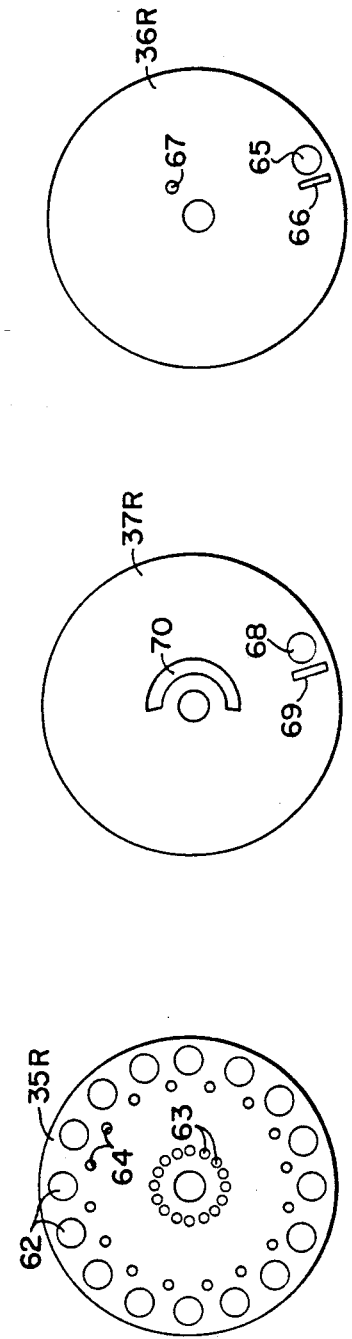
FIG 8
FIG 7
FIG 6

APPARATUS FOR PEELING FOOD PRODUCTS

BACKGROUND OF THE INVENTION

Many natural food products are harvested with a natural outer covering or peel which must be removed to gain access to the edible interior. Foods with such coverings come from all different categories of food products, e.g., citrus fruit, peaches, tomatoes, potatoes, shrimp, fish, etc. In each instance the edible center of the food is moist and delicate while the covering is a somewhat impervious moisture barrier which may be more or less fragile to tearing or bursting. It is known that in general a rapid scalding action with hot water may loosen a peeling and make it easier to separate from its edible center. There have also been some inventions patented in this general area of technology, e.g., U.S. Pat. Nos. 3,759,166; 4,569,850; and 4,671,965. These patented inventions generally employ shock treatments of temperature and/or pressure to loosen the peeling. In each instance, however, there are undesirable effects, such as damage to the edible portions of the food, reliance on noncontinuous procedures, complex machinery, etc.

It is an object of this invention to provide a novel, simple, continuous apparatus for removing the outer coverings from food products. It is another object of this invention to provide an apparatus for continuously removing the peelings from citrus fruit without damage to the edible center. Still other objects will appear from the more detailed description which follows.

BRIEF SUMMARY OF THE INVENTION

This invention relates to an apparatus for continuously removing the outer covering of food which comprises:

(a) a continuously rotatable drum having a generally cylindrical outer surface and a horizontal axis about which said drum rotates;

(b) a plurality of individual compartments mounted within said outer surface and having covers which are selectively individually openable and closable;

(c) means for supplying a hot gaseous fluid to each said compartment at selected times;

(d) means for supplying a vacuum to each said compartment at selected times;

(e) means to remove vapors from each said compartment at selected times;

(f) means for filling each said compartment with food having outer coverings thereon; and (g) means to remove said food and said outer coverings from each said compartment and to separate the food values from the outer coverings.

In specific and preferred embodiments of the invention the food being treated is citrus fruit; the individual compartments of food are separately and individually subjected to steam and then to an instantaneous vacuum, the treated food is discharged onto a plurality of counterrotating rollers to strip away partially attached coverings and the empty compartments are returned to be refilled and pass through the treatment cycle again.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 3 is a side elevational view of a food treatment compartment of this invention;

FIG. 6 is a side elevational view of a first valve plate employed in this invention;

FIG. 7 is a side elevational view of a second valve plate employed in this invention; and FIG. 8 is a side elevational view of a third valve plate employed in this invention.

DETAILED DESCRIPTION OF THIS INVENTION

The features of this invention are best understood by reference to the drawings attached hereto. In these drawings and in this description the food products to be peeled are oranges. This is purely for illustrative purposes and it is to be understood that other peelable natural food products may be peeled by this apparatus by employing only minor adjustments which will be obvious to those skilled in this art. Other food products which are intended to be treated by this apparatus are grapefruits, limes, lemons, tangerines, peaches, apricots, apples, tomatoes, potatoes, shrimp, clams, scallops, oysters, catfish and other food products having flexible impervious, fragile peelings that normally are removed by hand or by paring with a knife.

Figure 1:
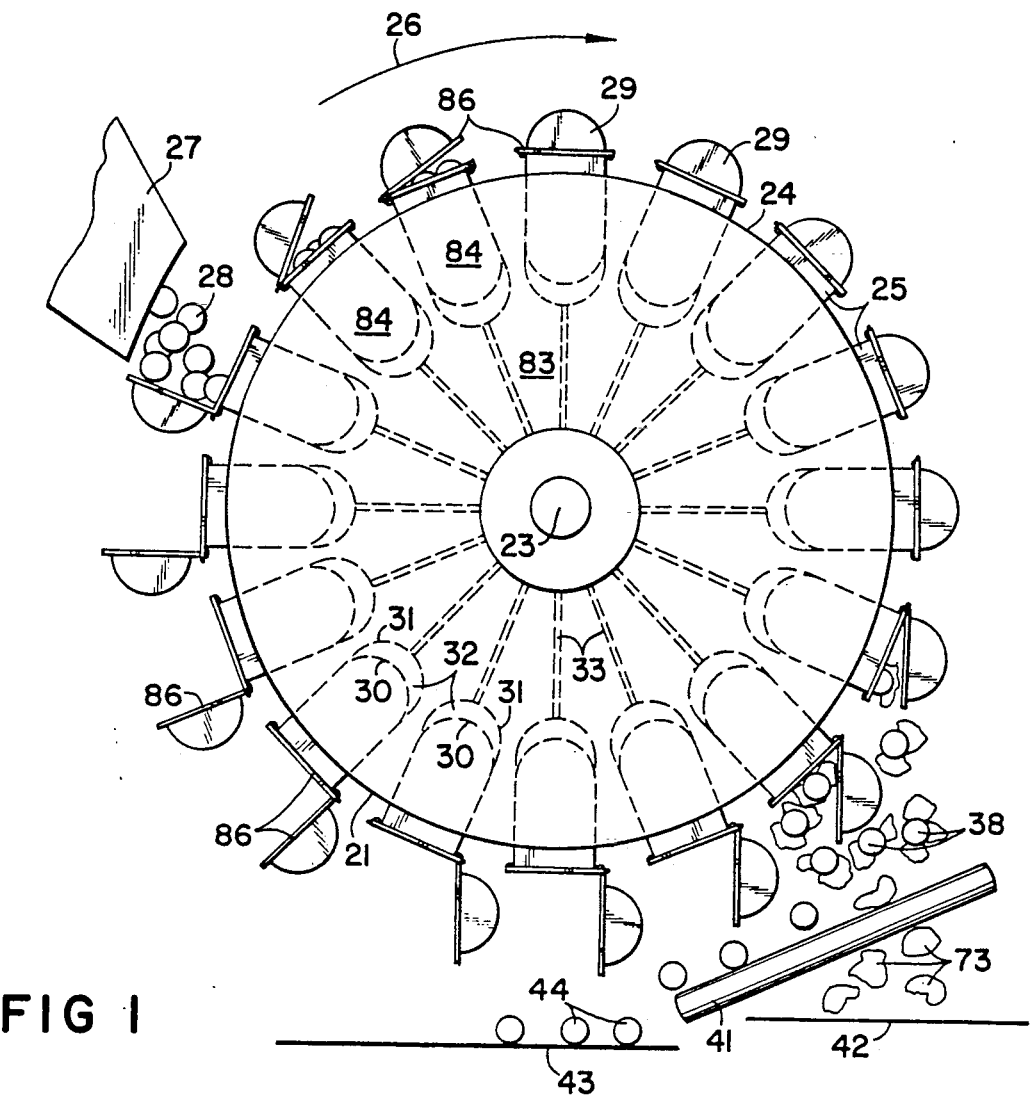
FIG. 1 is an end elevational view of the apparatus of this invention.
Figure 2:
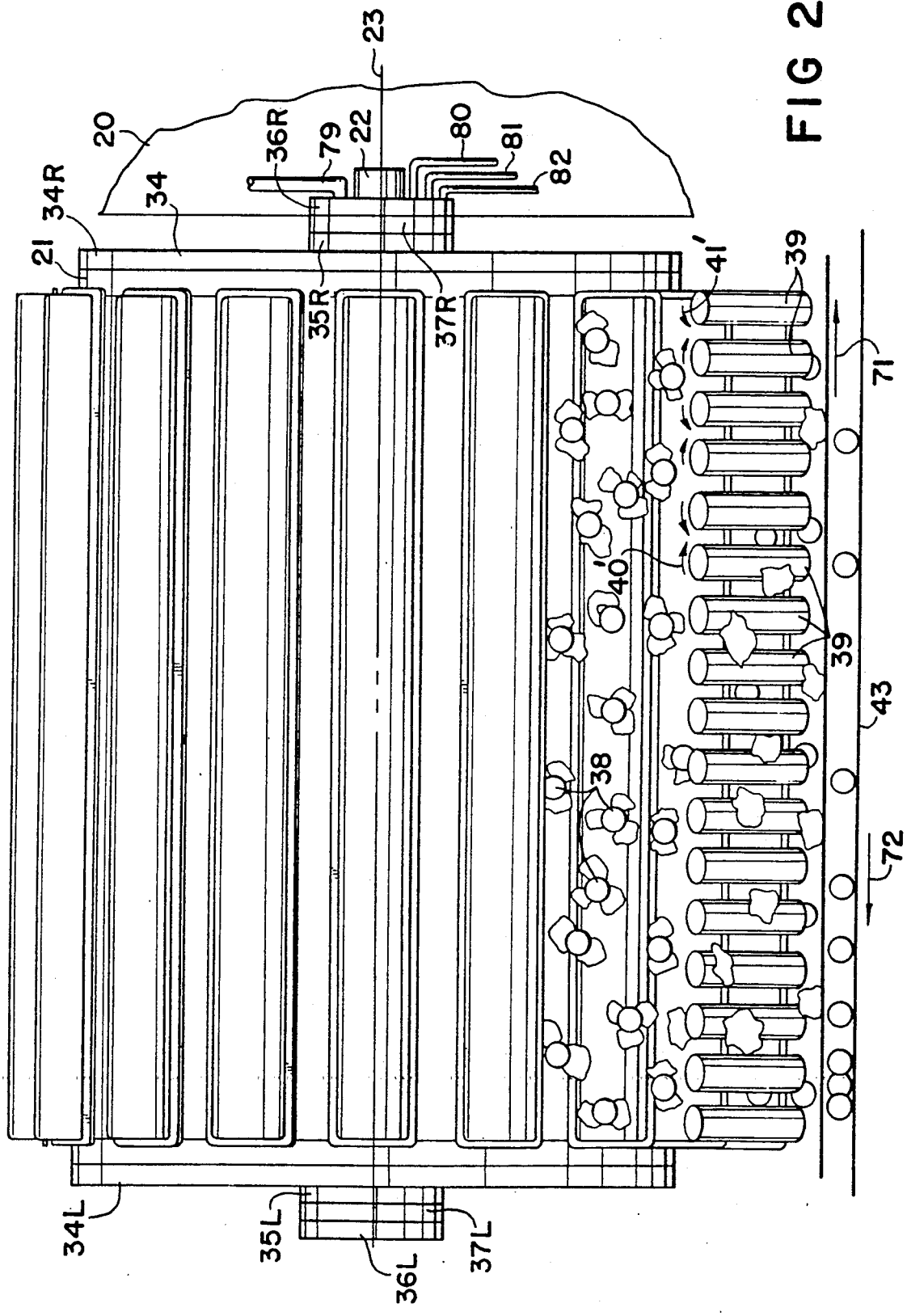
FIG. 2 is a side elevational view of the apparatus of this invention.

In FIGS. 1-2 there is shown schematically the apparatus of this invention. A stationary housing 20 supports a rotatable drum 21 having central horizontal shaft 22 mounted in suitable journals (not shown). Drum 21 is rotated at speeds of about 0.1-1.0 rpm around axis 23 of shaft 22 by means not shown, such as a motor with a chain or pulley or gear drive connecting the motor to drum 21. Drum 21 has two ends 34 and a generally cylindrical outer surface 24. Outer surface 24 need not be smoothly cylindrical but rather may be a plurality of adjoining flat surfaces, such that a cross section perpendicular to axis 23 would be a polygon of many sides, preferably about 10-30. Positioned around outer surface 24 are a plurality of food treating compartments 25, each having a main body 45 embedded in the central structure 83 of drum 21 and a removable cover 29 projecting outwardly from outer surface 24. Each compartment 25 is positioned with its vertical axis along a radius of drum 21, and it extends lengthwise for the full length of drum 21, that is from one end 34L to the other end 34R. It is not necessary that each compartment 24 extend from end 34L to end 34R, since this length could be occupied by two or more shorter compartments 25, but it is preferred, for the sake of efficiency, that compartment 25, whether in one piece or more than one piece, extend over substantially all of the length between end 34L and end 34R so as to utilize the maximum capacity for peeling treatment. The height of compartment 25 in the radial direction of drum 21 will be governed principally by the space available in drum 21 and by the inherent strength of the food to resist crushing. For most foods this height ought to be not more than about 2 feet.

The interior of compartment 25 is divided into an upper space 84 and a lower space 85 by a perforated support shelf or wall 30. Oranges will occupy all of upper space 84 and vapor condensate will collect in space 85. The outside wall of main body 45 including bottom wall 31, is solid, e.g. steel, and capable of containing liquid and vapor, and must be capable of withstanding mild superatmospheric and subatmospheric pressures, e.g., from about 20 psi to about 30 inches mercury (vacuum), respectively.

Cover 29 is capable of being closed or opened upon compartment 25, main body 45 which has an open top 46. Cover 29 will generally be open when compartment 25 is being loaded with oranges to be treated or being discharged of treated oranges, and will be closed during the period of treatment to loosen or remove the orange peel. Cover 29 preferably is hinged at 56 (see FIG. 4) and has a flange portion 47 around its open perimeter to mate with a similar flange portion 48 around the perimeter of the open top 46 of main body 45. A preferred structure of the mating flange portions 47 and 48 is shown in FIG. 5 and will be described below. There is no criticality of the structure and operation of cover 29 so long as it is capable of changing compartment 25 from an open vessel to a closed vessel and can withstand the treatment conditions. Cover 29 may be bolted, screwed, clamped, or otherwise fastened to main body 45 to provide a closed vessel. The preferred means is shown in FIGS. 1-2 wherein cover 29 is hinged to main body 45. This facilitates the steps in the continuous operation of treatment provided in one revolution of drum 21. Conduits, generally at 33, are shown leading into each compartment 25 for purposes of providing air, steam, and vacuum as needed in the treatment process. Conduits 33 are connected through valve plates 35, 36, and 37 and conduits 80, 81, and 82 to sources of air, steam, and vacuum outside of the treating apparatus. The details of such connections will be discussed below with respect to FIGS. 3-8.

The general order of the continuous treatment of this invention may be seen in FIGS. 1-2. Whole oranges 28 with their peels intact are directed into open compartments 25 through hopper 27 or any other loading means, e.g., swinging chute or an overhead basket moved into and out of position by a crane. In any event drum 21 continuously rotates in the direction of arrow 26 and while such single compartment 25 passes the clock position of about 9-11 o'clock, lids 29 are open and oranges 28 are loaded into the compartment interior to fill it up. As drum 21 rotates to the 12 o'clock position, cover 29 is closed and clamped shut. The preferred method of clamping is by the application of an internal vacuum around the flange 86 joining cover 29 to body 45 (see FIG. 5). As each compartment 25 moves from 12 o'clock to 3 o'clock the interior of each compartment is first treated with steam for a short period, e.g. about 3 minutes to cause the heat to just pass through the peel; and then treated with an instantaneous vacuum for a short period, e.g. 20 seconds at about 27-29 inches of Hg; to cause a sudden flash evaporation of moisture below the peel causing the peel to be blasted apart. The compartment is then subjected to air to break the vacuum. At about 3-4 o'clock the cover 29 is opened by releasing the clamping means (in the preferred method by injecting air to break the vacuum on flange 86) which permits cover 29 to hang open by gravity as drum 21 rotates between 3 o'clock and 9 o'clock. Each compartment empties its contents onto a means for separating the peeled orange 44 from its peeling 73 and conducting each away for further treatment or for disposal. In the case of oranges, the peeled orange 44 may be moved away by conveyor 43 in the direction of arrow 72 to a treatment of crushing to produce juice or a treatment of cutting or chopping for the preparation of orange slices or bits for canning. Peelings 73 are moved on conveyor 42 in the direction of arrow 71 to further treatment in extraction of oil, crushing for release of aromatic essences, and drying for final disposal.

In many instances the food products 38 leaving compartments 25 are not completely separated into peeled centers such as peeled oranges 44 and outer coverings 73 such as orange peels. A separating step is generally required which may take any of several forms. Shown here as an illustration is a plurality of inclined parallel, counterrotating rollers 41. One end of the rollers 41 is at a higher elevation, closer to the open compartments 25 while the other end of the rollers 41 is at a lower elevation closer to conveyor 43. The purpose for the inclination of rollers 41 is to allow the partially peeled orange 38 to roll down the incline while the peeling is completely separated from the peeled center 44 which rolls onto conveyor 43 to be carried away for further treatment or for use elsewhere. Rollers 41 are rotated such that adjacent rollers 42 are rotated in opposite directions as shown by arrows 40' and 41'. Very little force is needed to pull the last remaining piece of peeling 73 from the orange center 44 and these counterrotating rollers are adequate for the purpose. Generally, rollers 41 are rubber or a similar elastomeric substance which is somewhat tacky to orange peel. Rollers 41 are spaced apart from each other a distance which is less than the minimum diameter of the peeled orange. Thus, the peeled orange 44 cannot fall between adjacent rollers 41 while peelings 73 may be pulled therebetween. Furthermore, the speed of rotation of rollers 41 may be varied to provide better peeling removal, faster, slower or providing different speeds to adjacent rollers. For each food product the spacings between rollers, the speed of rotation, and the composition of the roller surface may be varied to provide the optimum combination for separation of the peel from the edible center.

Figure 4:
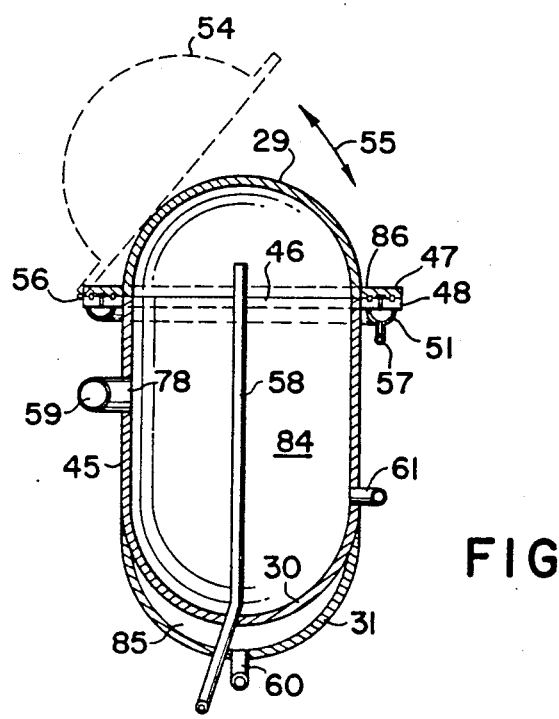
FIG. 4 is a cross-sectional view taken at 4—4 of FIG. 3.
Figure 5:
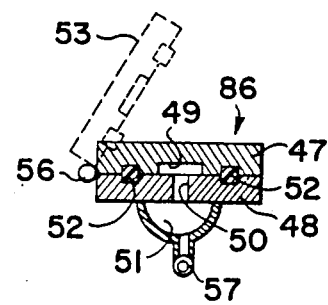
FIG. 5 is a cross-sectional view taken at 5—5 of FIG. 3.

In FIGS. 3-5 there are shown the details of each food treating compartment 25, which has a main body 25, a cover 29, an interior perforated support plate or screen 30, and flange 86. In these drawings the compartment is shown as a long, narrow, open-top vessel with a hinged cover 29, remotely resembling a luggage trunk. The compartment has already been described as having an internal space in body 45 divided by perforate wall 30 into a food containing upper portion 84 and a liquid collecting lower portion 85. The cover 29 and the bottom wall 31 are both shown as being generally semicylindrical, although such a shape is not required. The internal space may be more angular, such as rectangular or triangular and cover 29 and bottom wall 31 may be flat or any other convenient shape so long as the compartment can contain food products during a treatment including heat, pressure, and vacuum applications. Piercing the walls of compartment 25 are conduits to direct steam, air, and vacuum into the compartment and to drain away liquids from the compartment. For example, conduit 58 is intended to direct steam, perhaps under a modest pressure, e.g., 5-20 psi, preferably less than about 10 psi into the compartment to be delivered throughout the interior. Conduits 60 and 61 are intended to conduct condensate and other liquids formed by the treatment process away for use or disposal. Conduit 60 serves as a drainage when compartment 25 is generally upright as at 10-2 o'clock in FIG. 1 while conduit 61 will serve as the drain when compartment is at 2-4 o'clock in FIG. 1. Conduit 59 serves to apply a sudden or instantaneous vacuum to the interior of compartment 25. Conduit 57 serves to apply a vacuum to flange 86 (including flange portions 47 and 48) and this may be a branch from vacuum conduit 59 or a separate line to the vacuum source outside the apparatus.

The general structure preferred for flange 86 including flange portions 47 and 48 is shown in FIG. 5. Flange portion 47 is attached to cover 29 and flange portion 48 is attached to main body 45. A slot or groove 49 is shown in the face of flange portion 47. A plurality of spaced passageways 50 are in flange portion 48 aligned with slot or groove 49. A manifold 51 is welded to the underside of flange portion 48 extending throughout the extent of flange portion 48 and serves to connect all passageways 50 to a vacuum when it is impressed on manifold 51. Manifold 51 is connected to an outside source of vacuum by conduit 57. Seals 52 are seated in both flange portions 47 and 48 so that when a vacuum is applied to manifold 51 the two flange portions will be clamped together and sealed against leakage. When cover 29 is to be opened after a period of being sealed shut by vacuum, air at atmospheric pressure or superatmospheric pressure is introduced through conduit 57 to break the vacuum and allow cover 29 to be opened. Conduits 57, 58, 59, 60 and 61, and any other needed for the treatment process are extended to one end 34L or the other end 34R of drum 21 and passed through valve plates 35, 36, and 37 to outside the apparatus of this invention for supply sources of steam, vacuum, air, and any other treatment condensate or vapor. Since each compartment 25 is long (e.g., 6-20 feet) from end 34L to end 34R it is preferred to have conduits entering compartment 25 at several locations lengthwise of compartment 25 so as to provide a uniform treatment to all food products substantially instantaneously. FIG. 3 shows a typical arrangement of such a plurality of conduit entrances.

FIGS. 6-8 show a preferred structure in a schematic fashion for valves through which treatment media may be conducted from a supply source to individual compartments 25 while continuously rotating on a drum 21. At each end 34L and 35R there is a plurality of valve plates positioned concentrically around shaft 22 and pressed against each other, normally with the assistance of seals, so as to provide passageways to permit or prohibit the passage of gases or fluids during treatment. In FIGS. 6-8 are shown typical valve plates. For any particular type of processing treatment these valve plates may take a unique pattern of holes, slots, etc. In the example shown here, plate 35R in FIG. 6 is fastened to drum 21 and rotates therewith. Plates 36R and 37R are rigidly affixed to apparatus housing 20 and are stationary. The positioning of 35R with respect to 36R and 37R may vary according to the rotary speed of the drum when the operator wishes to change the length of time for each treatment step for a fine adjustment to provide optimum peeling removal. Plate 35R has a plurality of passageways 62 to conduct vacuum through conduit 59 to compartment 25 (see FIGS. 3-4). Passageways 64 may be employed to admit air to relieve the vacuum in manifold 51 and allow cover 29 to open. Passageways 63 may be employed to connect a vacuum to manifold 51 to hold cover 29 tightly closed. In valve plate 36R there is a passageway 65 to match passageways 62 in plate 35 to allow vacuum to pass to passageways 62. Passageway 67 aligns with passageways 63 in plate 35R to conduct a vacuum to close cover 29. Slot 66 is intended to provide air to connect with passageways 64 in plate 35R to conduct air to break the vacuum in compartment 25 and in cover 29. Openings and slots in plate 37R may be modified with respect to plate 36R to lengthen or shorten the time that cover 27 is closed or open, or more precisely when to supply vacuum to cover 29. It may be seen that as plate 35R rotates past plates 36R and 37R, individual passageways 62, 63 and 64 will be connected and disconnected to sources of vacuum and air to provide the necessary steps in the treatment. The speed of rotation of drum 21 and the positioning of passageways in valve plates 35R, 36R and 37 will determine the time lapse of each treatment step. Valve plates 35L, 36L and 37L may be employed to supply steam through conduit 58 and to remove condensate and vapors through conduits 60 and 61. Such plates are not shown here for the sake of brevity of this description, and because it is obvious that such will generally resemble FIGS. 6-8 although perhaps with different sizes and arrangements of passageways such as 62-70. Consequently, two complete valves are used for the explained purpose, one being located at one end and the other located at the other end of the rotating drum.

A typical apparatus for peeling oranges might employ a drum of about 6-10 feet in diameter, 10-12 feet long, carrying 12-20 compartments and rotating at about 1 revolution per 3-5 minutes to peel about 3-5 tons of oranges per hour.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. An apparatus for continuously removing the outer covering of a natural food having a flexible, parable outer covering which comprises:
   a. a continuously rotatable drum having a generally cylindrical outer surface and a horizontal axis about which said drum rotates;
   b. a plurality of individual compartments mounted on said outer surface and having covers which are selectively individually openable and closable;
   c. means for supplying a hot gaseous fluid to each said compartment at selected times;
   d. means for supplying a vacuum to each said compartment at selected times;
   e. means to remove vapors and condensate from each said compartment at selected times;
   f. means for filling each said compartment with said natural food having said outer covering thereon; and
   g. means to remove said food and said outer coverings from each said compartment and to separate the edible center of said food from said outer coverings.

2. The apparatus of claim 1 wherein said food is a fruit.

3. The apparatus of claim 2 wherein said fruit is a citrus fruit.

4. The apparatus of claim 1 wherein said food is a seafood.

5. The apparatus of claim 4 wherein said seafood is shrimp.

6. The apparatus of claim 1 wherein said means c, d, e, f, and g are applicable to each said compartment at separate and distinct times from each other said compartment.

7. The apparatus of claim 1 which additionally includes h. means for supplying to said compartment air at or above atmospheric pressure to relieve a vacuum being applied to said compartment.

8. The apparatus of claim 1 wherein said covers include vacuum means to maintain said covers closed.

9. The apparatus of claim 1 wherein means g includes a plurality of parallel rollers having open spaces between adjacent rollers smaller than the smallest dimension of said edible center with said outer coverings removed, said rollers each having a long axis about which said roller is rotated, with adjacent rollers being rotated in opposite directions with respect to each other, and with said rollers being inclined with their axes at an angle with the horizontal to produce a high end and a low end of said rollers, and being positioned to receive said edible center and said outer coverings from said compartment at said high end.

10. An apparatus for continuously processing natural food having an edible center and a removable inedible outer natural covering, and continuously removing said covering and recovering said edible centers; said apparatus comprising:
 a. a housing including a stationary base supporting a generally cylindrical drum having a cylindrical outer surface and being rotatable about a central horizontal axis;
 b. a plurality of food treating compartments affixed to said drum and being equally spaced around said outer surface with open tops adjacent said outer surface, said compartments extending lengthwise of said drum and being positioned parallel to said axis;
 c. a closable and openable cover for each said compartment;
 d. valved conduit means for supplying steam to the interior of each said compartment individually;
 e. valved conduit means for supplying instantaneously a vacuum to the interior of each said compartment individually;
 f. valved conduit means for supplying air to the interior of each said compartment individually to break said vacuum;
 g. means to fill each said compartment with said natural food;
 h. means to empty each said compartment individually of said natural food after treatment to remove said outer coverings;
 i. means for conveying said natural food products away from said housing and removing and separating said outer coverings from said edible centers.

11. The apparatus of claim 10 wherein said compartments are long, narrow, vessels with open tops, closed bottoms, and hinged covers capable of sealing the top so as to contain steam at superatmospheric pressure, said vessels being constructed internally with a perforate bottom spaced above the bottom of the vessel and adapted to hold said food above the bottom of the vessel.

12. The apparatus of claim 10 which additionally comprises a valve having a stationary plate affixed to said housing and a rotating plate affixed to said drum, said plates being mounted coaxially along said axis of said drum so as to be continuously in contact with each other, said rotating plate having a plurality of spaced passageways therethrough connected by conduits to each said compartment, and said stationary plate having a plurality of passageways therethrough connected by conduits to sources of steam, air, vacuum, condensate, and the like.

13. The apparatus of claim 10 wherein said means to fill comprises a hopper and a chute to conduct said food from said hopper to said compartment with its cover open.

14. The apparatus of claim 10 wherein said means for conveying includes a plurality of spaced rotatable parallel inclined rollers adapted to receive at their higher ends said food after treatment in said compartments and to discharge at their lower ends said edible centers, while the peel passes between adjacent rollers to a collection means below said rollers.

15. The apparatus of claim 14 wherein adjacent said rollers are spaced apart a distance less than minimum diameter of said edible center, and adjacent said rollers rotate in opposite directions respectively.

16. The apparatus of claim 11 wherein said covers and said open tops include cooperating flanges which are adapted to clamp against each other by the application of a vacuum.

* * * * *